(12) United States Patent
Ikeda et al.

(10) Patent No.: US 6,973,118 B1
(45) Date of Patent: Dec. 6, 2005

(54) DIGITAL BROADCASTING APPARATUS

(75) Inventors: Yasunari Ikeda, Kanagawa (JP);
Toshihisa Hyakudai, Chiba (JP);
Takahiro Okada, Saitama (JP);
Tamotsu Ikeda, Tokyo (JP); Toru Kuroda, Tokyo (JP); Naohiko Iai, Tokyo (JP); Kenichi Tsuchida, Tokyo (JP); Makoto Sasaki, Tokyo (JP)

(73) Assignees: Sony Corporation, Tokyo (JP); Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/914,131

(22) PCT Filed: Feb. 25, 2000

(86) PCT No.: PCT/JP00/01091

§ 371 (c)(1),
(2), (4) Date: Jan. 6, 2002

(87) PCT Pub. No.: WO00/51275

PCT Pub. Date: Aug. 31, 2000

(30) Foreign Application Priority Data

Feb. 25, 1999  (JP) ................................. 11/048961

(51) Int. Cl.[7] .......................... H04B 1/69; H04J 11/00; H04N 5/94
(52) U.S. Cl. ......................... 375/146; 370/210; 386/47
(58) Field of Search ....................... 375/146; 370/478, 370/210; 386/47

(56) References Cited

U.S. PATENT DOCUMENTS 5,228,025 A * 7/1993 Le Floch et al. ........... 370/206
5,610,908 A * 3/1997 Shelswell et al. ........... 370/210
6,256,508 B1 * 7/2001 Nakagawa et al. .......... 370/312
6,275,506 B1 * 8/2001 Fazel et al. ................. 370/478
6,609,039 B1 * 8/2003 Schoen ........................ 700/94

FOREIGN PATENT DOCUMENTS

JP      2000-115119     4/2000
WO      WO 99/01956 A1  1/1999

OTHER PUBLICATIONS

Journal of the Institute of Image Information and Television Engineers, Nov. 20, 1998, vol. 52, No. 11, pp. 1562-1566, "Chijyou Digital Housou no Kaihatsu Doukou 4-1 Densou Houshiki".
Proceedings of Giken public lecture and research presentation, (Japan), May 22, 1998 p. 67-72, "Chijyou Digital Hoso no Denso Houshiki ~ Kotei Jyushin oyobi Idou Jyushin ni okeru Densou Tokusei", p. 69, line 14 to p. 70, line 29.

* cited by examiner

Primary Examiner—Stephen Chin
Assistant Examiner—Cicely Ware
(74) Attorney, Agent, or Firm—Frommer Lawrence & Haug LLP; William S. Frommer; Samuel S. Lee

(57) ABSTRACT

A frequency interleaving circuit frequency-interleaves main signals generated according to sound data by parameters set according to frequencies of transmission channels. A sub-signal generating circuit generates sub-signals for transmission control including pilot signals. Mapping circuits modulate the sub-signals by using pseudo-random sequences generated based on initial values of random codes set according to frequencies of transmission channels. The frequency-interleaved main signals and the sub-signals modulated by the mapping circuits are OFDM-modulated. Then, they are converted to the frequencies of the transmission channels. An increase of a dynamic range of transmission signals can be suppressed by controlling the initial values of random codes set.

8 Claims, 6 Drawing Sheets

FIG.3

| Segment Number | 11 | 9 | 7 | 5 | 3 | 1 | 0 | 2 | 4 | 6 | 8 | 10 | 12 |
|---|---|---|---|---|---|---|---|---|---|---|---|---|---|
| Sub-channel Number | 2, 3, 4 | 5, 6, 7 | 8, 9, 10 | 11, 12, 13 | 14, 15, 16 | 17, 18, 19 | 20, 21, 22 | 23, 24, 25 | 26, 27, 28 | 29, 30, 31 | 32, 33, 34 | 35, 36, 37 | 38, 39, 40 |

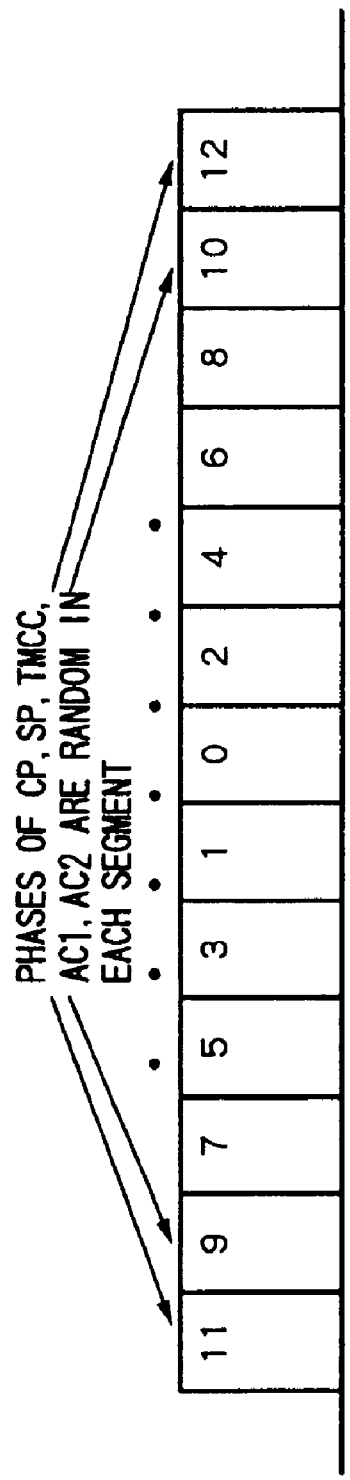

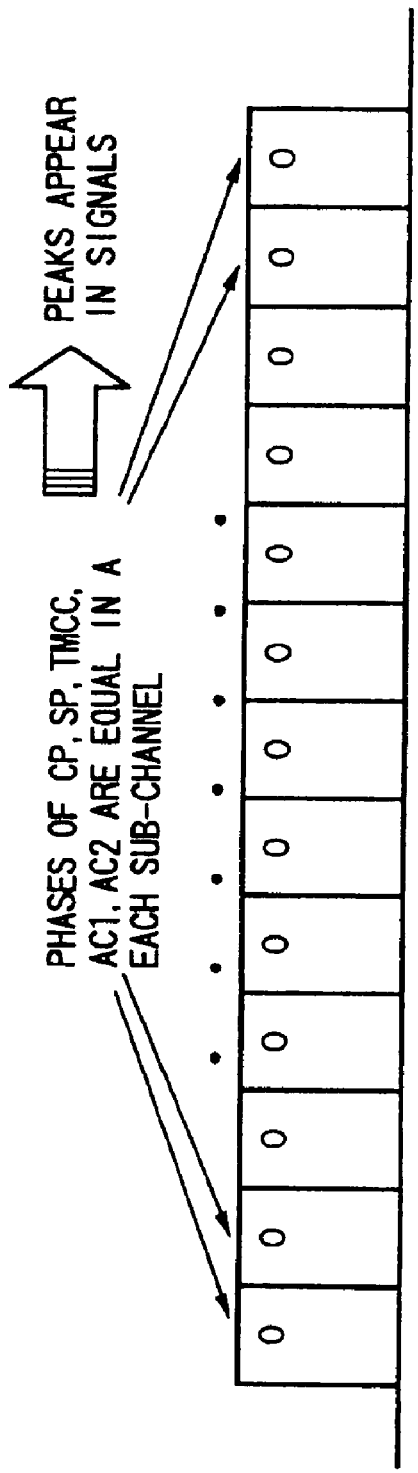

DIGITAL BROADCASTING APPARATUS

This Application is a 371 of PCT/JP00/01091 Feb. 25, 2000.

TECHNICAL FIELD

The present invention relates to a digital broadcasting apparatus, in particular to a digital broadcasting apparatus for digital terrestrial sound broadcasting.

BACKGROUND ART

As provisional systems of digital terrestrial television broadcasting and digital terrestrial sound broadcasting, broadcasting systems called the broadband ISDB-T system and narrow-band ISDB-T system have been proposed. These broadcasting systems are compatible with each other. At a bandwidth of about 429 kHz, which is obtained by dividing into 14 the 6 MHZ frequency band assigned to Japanese domestic television channels, an OFDM-(orthogonal frequency division multiplexing) modulated basic transmission unit called segment is formed. This segment is used for digital terrestrial television broadcasting or digital terrestrial sound broadcasting.

Signals of segment are OFDM-modulated. As the number of OFDM carriers of the segment, the three modes of 108, 216, and 432 carriers are defined. It is specified by the provisional systems that in digital terrestrial television broadcasting, a transmission signal is formed by using 13 segments, while in digital terrestrial sound broadcasting, the transmission signal is formed by using one or three segments.

The OFDM carriers within a segment are modulated by the same modulation scheme. As modulation schemes, DQPSK, QPSK, 16QAM, 64QAM, etc. are defined. In the OFDM carriers within a segment, in addition to carriers for transmitting information, there are also various pilot signals and transmission control signals. The pilot signals include CP (continual pilot) and SP (scattered pilot) signals. The transmission control signals include a TMCC (transmission and multiplexing configuration control) signal. Further, as additional information, there are AC1 (auxiliary channel 1), AC2 (auxiliary channel 2), and other signals. Among the pilot signals, CP and SP are BPSK-(binary phase shift keying) modulated by the output of PRBS (pseudo-random bit stream) code sequences corresponding to the carrier number. In addition, the additional information AC1 and AC2 at the OFDM symbol of the header of a frame, in the same way as the pilot signals CP and SP, are BPSK-modulated based on the output of the PRBS code sequences corresponding to the carrier number. At the subsequent OFDM symbols, differential BPSK modulation is done by the additional information to be transmitted with reference to the phase of the additional information AC1 and AC2 at the OFDM symbol of the header of the frame. In the transmission control signal TMCC at the OFDM symbol of the header of a frame as well, in the same way as the additional information AC1 and AC2, are BPSK-modulated based on the output of the PRBS code sequences corresponding to the carrier number. At the subsequent OFDM symbols, differential BPSK modulation is done based on the information of the transmission control signal TMCC with reference to the phase at the OFDM symbol of the header of the frame.

In the broadband ISDB-T system, signals are formed by 13 segments. Although these segments use PRBS code sequences using the same generator polynomials, they are set to have different initial values according to segment number and are configured so that there are no conflicts in the phases of pilot signals CP at the top and end of adjacent segments. The purpose of changing the initial values for the PRBS code sequences according to the positions of segments in the above way is to randomize as much as possible the phases of the pilot signals CP and SP in the segments to prevent occurrence of peaks in broadband ISDB-T signals and to make the signal dynamic range smaller.

FIG. 5 is a view of the configuration of segments of the digital terrestrial television broadcasting system, namely, the broadband ISDB-T system, as well as the phases of the various pilot signals CP and SP, the transmission control signal TMCC, and the additional information AC1 and AC2.

As shown in this figure, in a signal of the broadband ISDB-T system, the phases of the pilot signals CP and SP, the transmission control signal TMCC, and the additional information AC1 and AC2 in each segment are randomly controlled. Therefore, occurrence of peaks in signals based on the broadband ISDB-T system can be prevented and the requirement of a dynamic range for a receiver can be relaxed.

According to the above digital terrestrial television and sound broadcasting systems, the frequency bands for broadcasting will be the frequency bands for the currently actually broadcast analog terrestrial television broadcasts. For example, it is planned to use the UHF band currently assigned to television broadcasting as the frequency band for the digital terrestrial television broadcasting and to use the VHF band currently assigned to television broadcasting as the frequency band used for digital terrestrial sound broadcasting. Therefore, it is expected that at least the current channel configuration of the VHF band assigned to digital terrestrial sound broadcasting will not change in the course of the transition from analog television broadcasting to digital. Namely, digital terrestrial broadcasting service will be commenced also on the basis of the current television channels. From this, it is expected that signals will be configured on the basis of the 6 MHZ (4 MHZ) bandwidth in digital terrestrial sound broadcasting.

In the narrow-band ISDB-T system used in digital terrestrial sound broadcasting, 1-segment and 3-segment format signals are defined. Due to this, there is only one type of segment number in the 1-segment format and three types in the 3-segment format. FIG. 6 is a view of the configuration of segments and a phase relation of various pilot signals in a narrow-band ISDB-T signal. As shown in the figure, when signals in a channel are all 1-segment signals, because all the 13 segments have the same segment number, initial values for the PRBS code sequences also become the same and phases of the pilot signals CP and SP in all 13 segments become the same as well. In addition, the transmission control signal TMCC and the additional information AC1 and AC2 when not modulated also have equal phases in all the 13 segments. From this, when viewing the entire signals in a channel, because there are many groups of carriers having the same phases, there arises a disadvantage that the possibility of occurrence of peaks in a transmission signal is high, and it is difficult to secure the dynamic range of the front-end amplifier in a receiver.

DISCLOSURE OF THE INVENTION

The present invention was made in consideration of the above situation and has an object to provide a digital broadcasting apparatus able to suppress an increase of a dynamic range of a broadcasting signal by controlling the carrier phases of signals in digital terrestrial broadcasting in accordance with the frequencies of the transmission channels.

In order to achieve the above object, the digital broadcasting apparatus of the present invention is a digital broadcasting apparatus for generating a digital broadcasting signal based on data of source information and modulating the same to a predetermined broadcasting frequency for output, comprising a sub-signal generating circuit for generating a sub-signal for controlling signal transmission; a random sequence generating circuit for generating a pseudo-random sequence using an initial value of a random code set based on the broadcasting frequency; a sub-signal modulating circuit for modulating the sub-signal using the pseudo-random sequence generated by the random sequence generating circuit; and a modulating circuit for performing modulation according to a predetermined modulation scheme using a main signal generated based on the data of source information and output signal of the sub-signal modulating circuit.

Alternatively, the digital broadcasting apparatus of the present invention is a digital broadcasting apparatus for generating a digital broadcasting signal based on data of source information and modulating it to a predetermined broadcasting frequency for output, comprising a frequency interleaving circuit for frequency interleaving a main signal generated according to the data of source information by using a parameter set based on the broadcasting frequency and a modulating circuit for modulating the frequency-interleaved main signal based on a predetermined modulation system.

Further, preferably, the present invention further comprises a sub-signal generating circuit for generating a sub-signal for controlling signal transmission and a sub-modulating circuit for modulating the sub-signal by using a pseudo-random sequence generated by using an initial value of a random number code set based on the broadcasting frequency and for supplying the modulated signal to the modulating circuit.

Further, in the present invention, preferably, the modulating circuit is an OFDM modulating circuit for performing OFDM modulation using the main signal and output signal of the sub-modulating circuit, and the data of source information is sound data obtained by encoding a sound signal. The bandwidth of the broadcasting frequency is divided into a plurality of channels, a specific channel number is assigned to each channel, and the random sequence generating circuit sets an initial value of a random number code for generating a pseudo-random sequence.

According to the present invention, in the digital broadcasting apparatus, the main signal generated from sound data is frequency-interleaved according to a given parameter. Further, a pseudo-random sequence is generated according to a given initial value of a random code. Using the pseudo-random sequence, pilot signals, transmission control signals, and other sub-signals are modulated. The interleaved main signal and modulated sub-signals are modulated in accordance with a predetermined modulation scheme, for example, the OFDM modulation scheme. The modulated signal is modulated to the broadcasting frequency and emitted from an antenna.

In the present invention, either the parameter of the frequency interleaving of the main signal or the initial value of the random number code for generating a pseudo-random sequence for sub-signal modulation is controlled according to the broadcasting frequency. As a result, it is possible to keep the dynamic range of the generated broadcasting signal as small as possible. Therefore, it is possible to easily secure a dynamic range of a front-end amplification circuit in a receiver.

BRIEF DESCRIPTION OF THE DRAWINGS

FIG. 3 is a view of the correspondence between segment numbers and sub-channel numbers.

FIG. 5 is a view of a configuration of segments and a phase relation of various pilot signals in a broadband ISDB-T signal.

FIG. 6 is a view of a configuration of segments and a phase relation of various pilot signals in a narrow-band ISDB-T signal.

BEST MODE FOR CARRYING OUT THE INVENTION

First Embodiment

Figure 1:
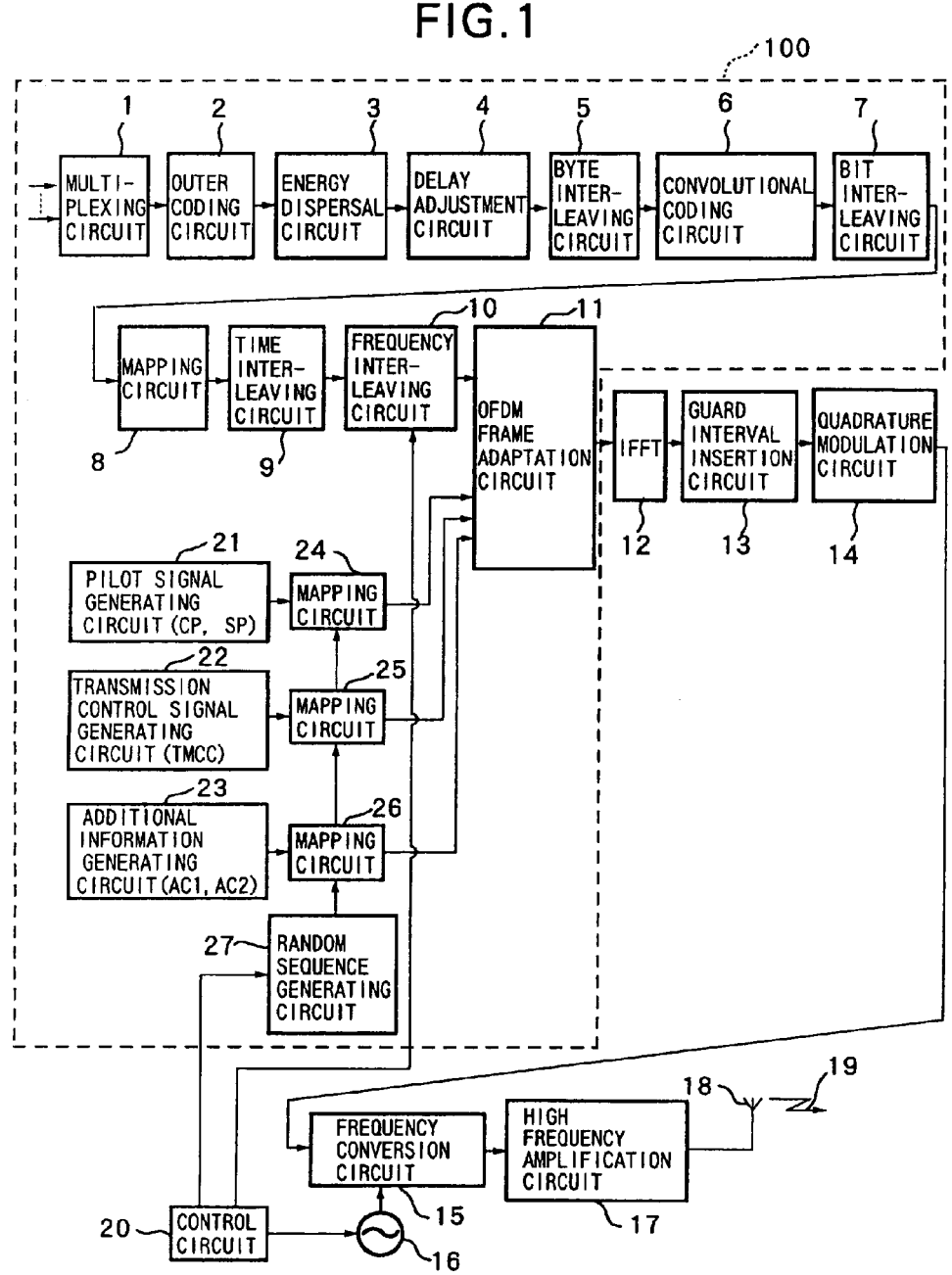
FIG. 1 is a circuit diagram of a first embodiment of a digital broadcasting apparatus according to the present invention.

FIG. 1 is a circuit diagram of a first embodiment of a digital broadcasting apparatus according to the present invention.

As shown in this figure, the digital broadcasting apparatus of the present embodiment is comprised of a broadcasting signal processing circuit 100 for processing one segment of a broadcasting signal, an inverse Fourier transform circuit 12 (IFFT), a guard interval insertion circuit 13, a quadrature modulation circuit 14, a frequency conversion circuit 15, a RF (radio frequency) signal oscillating circuit 16, a high frequency amplification circuit 17, a transmission antenna 18, and a control circuit 20.

Next, the circuits making up the digital broadcasting apparatus of the present embodiment will be explained.

The broadcasting signal processing circuit 100, as shown in this figure, is comprised of a multiplexing circuit 1, an outer coding circuit 2, an energy dispersal circuit 3, a delay adjustment circuit 4, a byte interleaving circuit 5, a convolutional coding circuit 6, a bit interleaving circuit 7, a mapping circuit 8, a time interleaving circuit 9, a frequency interleaving circuit 10, an OFDM frame adaptation circuit 11, a pilot signal generating circuit 21, a transmission control signal generating circuit 22, an additional information generating circuit 23, mapping circuits 24, 25, and 26, and a random sequence generating circuit 27.

The multiplexing circuit 1, for example, generates a so-called transport stream (TS) obtained by time-division-multiplexing bit streams of a plurality of encoded source information including digital sound signals.

The outer coding circuit 2 receives the bit streams multiplexed by the multiplexing circuit 1 and performs outer coding for the bit streams by Reed-Solomon encoding.

The energy dispersal circuit 3 randomizes the information of the bit streams encoded by the outer coding circuit 2 for energy dispersal.

The delay adjustment circuit 4 adjusts the delay time of the randomized bit streams.

The byte interleaving circuit 5 carries out convolutional interleaving for data output from the delay adjustment circuit 4 to spread residual errors of the convolutional codes.

The convolutional coding circuit 6 convolutionally encodes the output signals from the byte interleaving circuit 5.

The bit interleaving circuit 7 interleaves the output signals from the convolutional coding circuit 6 and outputs the obtained data to the mapping circuit 8.

The mapping circuit 8 performs mapping in order to modulate the input data sequences to the OFDM modulation carriers. Specifically, for example, the mapping circuit 8 assigns signal points of the OFDM carriers and outputs the processed signals to the time interleaving circuit 9.

The time interleaving circuit 9 interleaves the output signals from the mapping circuit 8 on the time axis and outputs the signals to the frequency interleaving circuit 10.

The frequency interleaving circuit 10 further interleaves the time-interleaved signals on the frequency axis and supplies the output signals to the OFDM frame adaptation circuit 11. Note that, in the present invention, the parameters of the frequency interleaving circuit 10 are controlled by the control circuit 20 according to the broadcasting frequencies.

The pilot signal generating circuit 21 generates pilot signals CP and SP. Then, the transmission control signal generating circuit 22 generates the transmission control signal TMCC. Furthermore, the additional information generating circuit 23 generates additional information AC1 and AC2 etc.

The mapping circuit 24 performs mapping for the pilot signals CP and SP in order to modulate the OFDM carriers. The mapping circuit 25 performs mapping for the transmission control signal TMCC in order to modulate the OFDM carriers. Furthermore, the mapping circuit 26 performs mapping for the additional information AC1 and AC2 in order to modulate the OFDM carriers. The output signals of these mapping circuits are all output to the OFDM frame adaptation circuit 11.

The random sequence generating circuit 27 generates pseudo-random sequences (PRBS code sequences) and supplies them to the mapping circuits 24, 25, and 26. In the random sequence generating circuit 27, initial values of random number codes used for generating the pseudo-random sequences are provided by the control circuit 20.

The OFDM frame adaptation circuit 11 receives the data sequences output from the frequency interleaving circuit 10 and the mapping circuits 24, 25, and 26 and assigns specific carriers to the data sequences output from the frequency interleaving circuit 10 and further assigns the mapped pilot signals CP and SP, the transmission control signal TMCC, and the additional information AC1 and AC2 as special OFDM carriers to form a frame.

The inverse Fourier transform circuit 12 (IFFT) carries out an inverse discrete Fourier transform on the output signals of the broadcasting signal processing circuit 100. The output signals of the broadcasting signal processing circuit 100 are obtained by OFDM modulation and are comprised by superposing a plurality of carriers modulated by a plurality of digital signals. In the inverse Fourier transform circuit 12, an inverse discrete Fourier transform is performed once for the OFDM-modulated waves in each transmission symbol duration. As a result, transmission signals on the time axis are obtained.

The guard interval insertion circuit 13 inserts a guard interval duration to the transmission signals obtained by inverse Fourier transform. This guard interval duration is a signal duration added for reducing the influence of multipath error (ghosts) in a receiver. Usually, the interval insertion duration is generated by repeating the signal waveform of a effective symbol duration for transmitting actual information. Note that an OFDM transmission symbol duration is formed by combining the guard interval duration and the effective symbol duration.

The quadrature modulation circuit 14 performs quadrature modulation on the signals output from the guard interval insertion circuit 13 and outputs quadrature modulation signals.

The frequency conversion circuit 15 uses the RF oscillating signals from the RF signal oscillating circuit 16 to carry out frequency conversion for the output signals of the quadrature modulation circuit 14. Due to this frequency conversion, the carriers of transmission signals are converted into a high frequency band for broadcasting use.

The high frequency amplification circuit 17 amplifies the amplitudes of the high frequency signals output from the frequency conversion circuit 15 and outputs the amplified signals to the transmission antenna 18.

The transmission antenna 18 emits into the space the high frequency signals amplified by the high frequency amplification circuit 17.

The control circuit 20 controls the operations of the frequency interleaving circuit 10 and the random sequence generating circuit 27 in the broadcasting signal processing circuit 100 and further controls the oscillating frequency of the RF signal oscillating circuit 16. For example, the control circuit 20 sets parameters of the frequency interleaving circuit 10 according to the frequency of the RF signal and sets the initial values of the random number codes of the random sequence generating circuit 27.

The digital broadcasting apparatus of the present invention carries out digital sound broadcasting based on sound signals conforming to the ISDB-T system.

Note that it is proposed to offset the frequency of the ISDB-T system digital signals by exactly $1/7$ MHZ in order to alleviate crosstalk with analog television signals. It may also be considered to apply offset according to the radio conditions of the service areas.

In order to simply deal with this offset, the concept of sub-channels is proposed. Specifically, the lowest end frequency of a channel is set as the center frequency of a zero-th sub-channel and a first sub-channel and a second sub-channel are successively defined every $1/7$ MHZ thereafter. Since the width of a segment is defined to be $3/7$ MHZ, adjacent segments overlap by $2/3$ of a segment's width. In addition, there is a sub-channel not overlapped in band at every three sub-channels.

Figure 2:
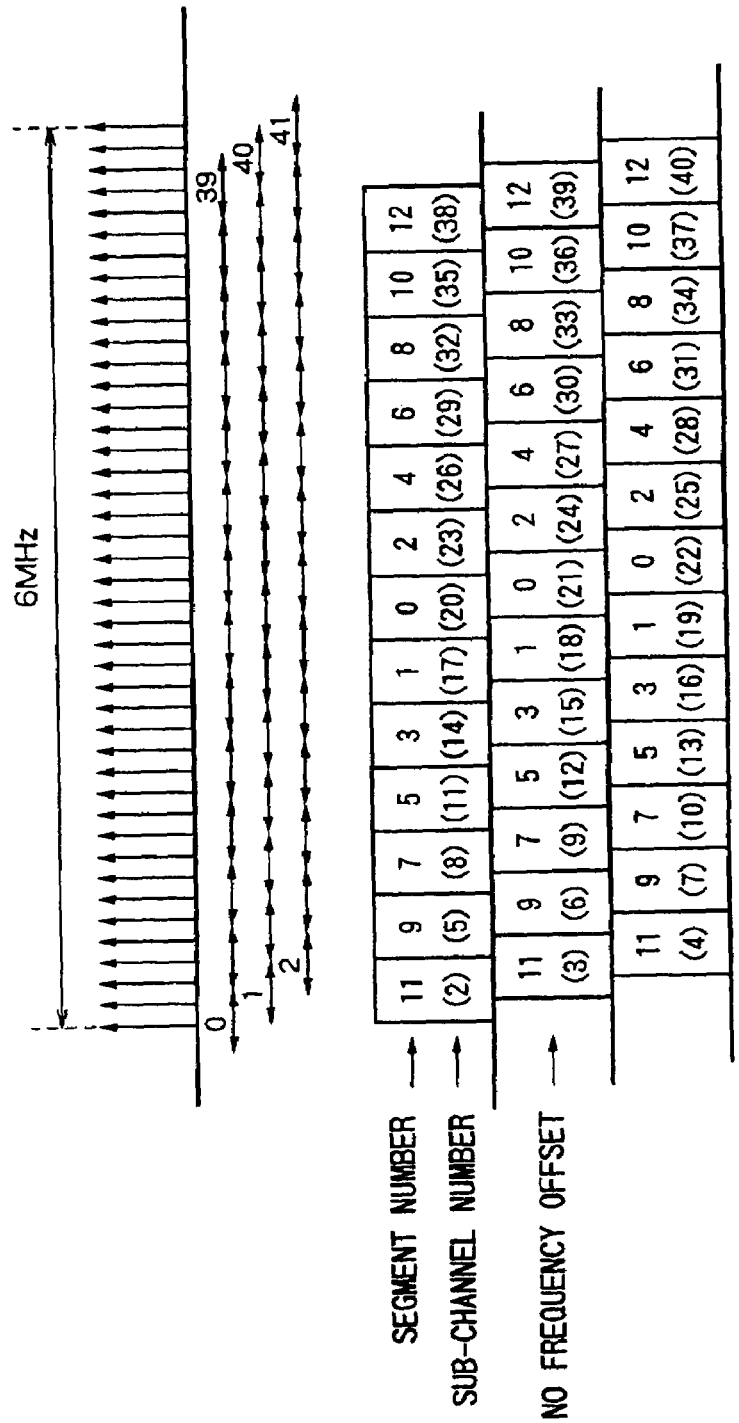
FIG. 2 is a view of the configuration of sub-channels in the ISDB-T system.

Here, comparing the positional relationship between the segments in the broadband ISDB-T system and the sub-channels, as shown in FIG. 2, if the frequency is not offset, the lowest end segment of the broadband ISDB-T system, the 11th segment, is located at the position of the third sub-channel, the ninth segment corresponds to the sixth sub-channel, and the 7th segment corresponds to the ninth sub-channel.

Next, if the frequency is offset to the lower side by exactly $1/7$ MHZ, the 11th segment corresponds to the second sub-channel, the ninth segment to the fifth sub-channel, and the seventh segment to the eighth sub-channel. Further, if the frequency is offset to the upper side by exactly $1/7$ MHZ, the 11th segment corresponds to the fourth sub-channel, the ninth segment to the seventh sub-channel, and the seventh segment to the 10th sub-channel. Here, since the segments existing at the zero-th, first, and 41st sub-channels have bandwidths spanning adjacent channels, there is no prospect for their use at the present. Due to this, the correspondence between segment numbers of broadcasting signals based on the broadband ISDB-T system and sub-channel numbers can be expressed as shown in FIG. 3. In this way, the segments in the broadband ISDB-T system can be linked with predetermined sub-channel numbers in accordance with the positions of the segments, namely, the frequencies of the segments.

On the other hand, in the narrow-band ISDB-T system, only 1-segment format and 3-segment format signals are defined. In a 1-segment signal, the segment number is defined to be 0, while the segment numbers of a 3-segment signal are defined as 0, 1, and 2. Since broadband ISDB-T system signals are comprised of 13 segments having different segment numbers according to the segment positions, the segment numbers and the sub-channel numbers have a correspondence as shown in FIG. 3. In the narrow-band ISDB-T system, however, if correspondence is set between the segment numbers and sub-channel numbers, the sub-channels for arranging narrow-band ISDB-T system signals would be fixed and arrangement at other sub-channel positions in the same channel would not be possible. Therefore, the standard calls for only defining the segment numbers and leaving the correspondence between the segment numbers and sub-channel numbers open so as to enable arrangement of the narrow-band ISDB-T system signals at any sub-channels in a channel.

As described previously, when for example all 13 sub-channels are 1-segment signals, the segment numbers of these 1-segment signals are all defined to be 0, so the initial values of the random number codes of the random sequence generating circuit that sets the phases of the pilot signals, transmission control signal, and additional information also become the same value. Therefore, in all sub-channels, all the phases of the pilot signals, transmission control signal, and additional information become uniform, and the possibility of occurrence of peaks in the broadcasting signals becomes large.

In order to avoid this, in the digital broadcasting apparatus according to the present embodiment, correspondence is established between the segment of the narrow-band ISDB-T signals and sub-channel numbers, in similar way to the broadband ISDB-T, according to the segment positions, namely, the segment frequencies and the initial values of the random number codes of the random sequence generating circuit are changed according to the sub-channel numbers. Due to this, even if 13 1-segment signals are arranged continuously, the initial values of the random number codes of the segment signals are different, so it is able to prevent all of the phases of the pilot signals, transmission control signal, and additional information from becoming uniform and to keep the dynamic range of the broadcasting signals small.

Below, the operation of the digital broadcasting apparatus of the present invention will be explained with reference to FIG. 1.

A plurality of source coded bit streams obtained by digitalizing and encoding the broadcasting signals are time-division multiplexed by the multiplexing circuit 1 to generate a transport stream. This transport stream is outer coded based on Reed-Solomon encoding and randomized by the energy dispersal circuit 3. The randomized data is adjusted by the delay adjustment circuit 4, then convolutionally interleaved by the byte interleaving circuit 5 in order to disperse the residual error of the convolutional code. The convolutional coding circuit 6 performs convolutional coding. The convolutional coding output is bit interleaved by the bit interleaving circuit 7, then the data sequences obtained by bit-interleaving are supplied to the mapping circuit 8 for modulating OFDM carriers.

In the mapping circuit 8, signal points of the OFDM carriers are assigned. The output is successively supplied to the time interleaving circuit 9 and the frequency interleaving circuit 10. The output of the frequency interleaving circuit 10 is further supplied to the OFDM frame adaptation circuit 11. Furthermore, the pilot signals CP and SP generated by the pilot signal generating circuit 21, the transmission control signal TMCC generated by the transmission control signal generating circuit 22, and the additional information AC1 and AC2 generated by the additional information generating circuit 23 are mapped by the mapping circuits 24, 25, and 26 and supplied to the OFDM frame adaptation circuit 11. The OFDM frame adaptation circuit 11 assigns these pilot signals CP and SP, the transmission control signal TMCC, and the additional information AC1 and AC2 as special OFDM carriers to form a frame.

The output of the frame adaptation circuit 11 is supplied to the inverse Fourier transform circuit 12 and transformed from frequency domain to time domain signals by inverse Fourier transform. Furthermore, the guard interval insertion circuit 13 inserts a desired guard interval duration, then the quadrature modulation circuit 14 quadrature modulates the real part and the imaginary part and outputs signals of an intermediate frequency. The OFDM modulated signals at the intermediate frequency band are converted to a desired frequency (RF band) by the frequency conversion circuit 15 and the RF signal oscillating circuit 16. The OFDM modulated signals of the RF band are amplified by the high frequency amplification circuit 17, then emitted as RF output signals 19 from the transmission antenna 18.

The oscillating frequency control circuit 20 controls the RF signal oscillating circuit 16 and controls the random sequence generating circuit 27 so that initial values for generating random sequences are changed depending on the frequencies at which the RF output signals 19 are emitted. Initial values for generating random sequence which depend on the frequencies of the output RF signals 19 are set in the random sequence generating circuit 27. The pilot carriers are BPSK-modulated by locations corresponding to the CP and SP frequency positions, while, in regards to carriers of the transmission control signal TMCC and the additional information AC1 and AC2, carrier phases at the OFDM symbol of the header of a frame are PBSK-modulated corresponding to their frequency locations. Note that, at the subsequent symbols, the carriers of the transmission control signal TMCC and the additional information AC1 and AC2 are differential BPSK-modulated by the transmission control signal and the additional information with reference to the phase of the frame header symbol. Simultaneously the oscillating frequency control circuit 20 also outputs a control signal to the frequency interleaving circuit 10 and sets the interleaving parameters within a segment in the frequency interleaving circuit 10 depending on the frequencies at which the RF output signals are emitted.

As described above, according to the present embodiment, the oscillating frequency control circuit 20 not only controls the oscillating frequency of the RF signal oscillating circuit 16, but also controls the initial values for the random sequences for deciding carrier phases for transmission of the pilot signals or transmission control signal and additional information in accordance with the frequencies and controls the parameters of the frequency interleaving circuit 10. Therefore, since the parameters of the frequency interleaving are controlled and the carrier phases of the pilot signals, transmission control signal, and additional information are controlled depending on the frequencies of the transmission signals in the narrow-band ISDB-T system signals, it is possible to prevent all of the carrier phases of the pilot signals, transmission control signal from becoming uniform, and additional information, possible to keep the dynamic range of the RF output signal 19 low, and possible to easily secure a dynamic range of front-end amplification in a receiver.

Second Embodiment

Figure 4:
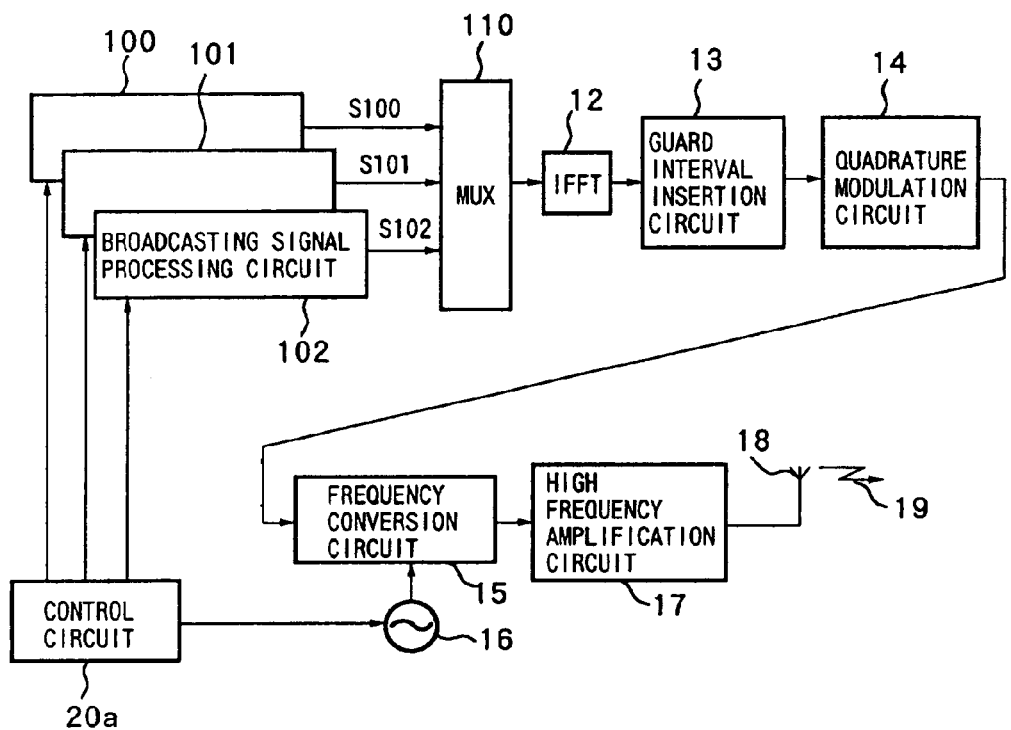
FIG. 4 is a circuit diagram of a second embodiment of a digital broadcasting apparatus according to the present invention.

FIG. 4 is a circuit diagram of a second embodiment of a digital broadcasting apparatus according to the present invention.

In the first embodiment of the present invention described above, the broadcasting signal processing circuit 100 basically processes 1-segment broadcasting signals. In the digital broadcasting apparatus of the present invention, however, it is possible to modulate not only single segment but also a plurality of narrow-band ISDB-T signals together. In this case, the circuits after the inverse Fourier transform circuit 12 can be shared by the plurality of narrow-band ISDB-T signals. The present embodiment is configured based on this.

As shown in FIG. 4, the digital broadcasting apparatus of the present embodiment is comprised of broadcasting signal processing circuits 100, 101, and 102, a multiplexing circuit (MUX) 110, an inverse Fourier transform circuit (IFFT) 12, a guard interval insertion circuit 13, a quadrature modulation circuit 14, a frequency conversion circuit 15, an RF signal oscillating circuit 16, a high frequency amplification circuit 17, a transmission antenna 18, and a control circuit 20a.

In the digital broadcasting apparatus according to the present embodiment, the inverse Fourier transform circuit (IFFT) 12, the guard interval insertion circuit 13, the quadrature modulation circuit 14, the frequency conversion circuit 15, the RF signal oscillating circuit 16, the high frequency amplification circuit 17, and the transmission antenna 18 have substantially the same configurations and functions as the corresponding circuits in the first embodiment as shown in FIG. 1. Therefor, detailed explanations of these circuits are omitted here.

The broadcasting signal processing circuits 100, 101, and 102 have substantially the same configuration. For example, they are the same as the broadcasting signal processing circuit 100 shown in FIG. 1. In the present embodiment, the broadcasting signal processing circuits 100, 101, and 102 process transport streams and output data sequences S100, S101, and S102, respectively.

The multiplexing circuit 110 assigns the data sequences S100, S101, and S102 output from the broadcasting signal processing circuits 100, 101, and 102 on the frequency axis, multiplexes them, and outputs the multiplexed signal obtained by multiplexing.

The multiplexed signal is subjected to an inverse Fourier transform by the inverse Fourier transform circuit 12 all together. By this transformation, the multiplexed signal is transformed from the frequency domain to the time domain. Furthermore, a predetermined guard interval is inserted by the guard interval insertion circuit 13, then an OFDM signal of the intermediate frequency band is generated by the quadrature modulation circuit 14.

The OFDM signal of the intermediate frequency band is converted into an OFDM signal of the RF signal band by the frequency conversion circuit 15 and the RF signal oscillating circuit 16. The RF band OFDM-modulated signal is amplified by the high frequency amplification circuit 17, then emitted as the RF output signal 19 from the transmission antenna 18.

In the digital broadcasting apparatus according to the present embodiment, the output frequency of the RF frequency oscillating circuit 16 is controlled by the oscillating frequency control circuit 20a. Further, control signals are output from the oscillating frequency control circuit 20a to the broadcasting signal processing circuits 100, 101, and 102 for processing the transport streams. Each broadcasting signal processing circuits controls initial values for random sequences for deciding carrier phases for transmission of the pilot signals CP and SP, transmission control signal TMCC, and additional information AC1 and AC2 and frequency interleaving parameters within a segment according to the corresponding sub-channel numbers. As a result, in narrow-band ISDB-T system signals, it is possible to prevent all of the carrier phases of the pilot signals, transmission control signal, and additional information from becoming uniform, possible to keep the dynamic range of the RF output signal 19 low, and possible to secure a dynamic range of front-end amplification in a receiver.

Note that, in the above, the explanation was made of the case in which three 1-segment signals are multiplexed for processing, but in the digital broadcasting apparatus according to the present embodiment, the number of signals multiplexed is not limited to three. It is possible to multiplex a larger number of signals for processing as well. In addition, the present invention is applicable even when 3-segment signals are mixed in addition to 1-segment signals.

CAPABILITY OF UTILIZATION IN INDUSTRY

As explained above, according to the digital broadcasting apparatus of the present embodiment, when generating broadcasting signals based on a predetermined broadcasting system, for example, the narrow-band ISDB-T system, there are the advantages that phases of the pilot signals, transmission control signal, and additional information in broadcasting signals can be controlled to be different from each other, the dynamic range of broadcasting signals can be kept as small as possible, and the dynamic range of a front-end amplification circuit can be easily secured.

What is claimed is:

1. A digital broadcasting apparatus for generating a digital broadcasting signal based on data of source information and modulating the same to a predetermined broadcasting frequency for output, comprising:
   a sub-signal generating circuit for generating a sub-signal for controlling signal transmission;
   a random sequence generating circuit for generating a pseudo-random sequence using an initial value of a random number code set based on said broadcasting frequency;
   a sub-signal modulating circuit for modulating the sub-signal using the pseudo-random sequence generated by the random sequence generating circuit; and
   a modulating circuit for performing modulation according to a predetermined modulation scheme using a main signal generated based on the data of source information and output signal of the sub-signal modulating circuit,
   wherein a bandwidth of said broadcasting frequency is divided into a plurality of channels with each channel of said plurality of channels being assigned a predetermined channel number, and wherein said random sequence generating circuit sets an initial value of a random number code for generating said pseudo-random sequence based on said channel number.

2. A digital broadcasting apparatus as set forth in claim 1, wherein said modulating circuit is an OFDM modulating circuit for performing OFDM modulation using said main signal and output signal of said sub-modulating circuit, and associating each channel with an OFDM segment.

3. A digital broadcasting apparatus as set forth in claim 1, wherein said data of source information is sound data obtained by encoding a sound signal.

4. A digital broadcasting apparatus for generating a digital broadcasting signal based on data of source information and modulating the same to a predetermined broadcasting frequency for output, comprising:
   a frequency interleaving circuit for frequency interleaving a main signal generated according to said data of source information by using a parameter set based on said broadcasting frequency;
   a modulating circuit for modulating said frequency-interleaved main signal based on a predetermined modulation scheme including generating a pseudo-random sequence,
   wherein a bandwidth of said broadcasting frequency is divided into a plurality of channels with each channel of said plurality of channels being assigned a predetermined channel number, and
   wherein said modulating circuit sets an initial value of a random number code for generating said pseudo-random sequence based on said channel number.

5. A digital broadcasting apparatus as set forth in claim 4, further comprising:
   a sub-signal generating circuit for generating a sub-signal for controlling signal transmission; and
   a sub-modulating circuit for modulating said sub-signal by using said pseudo-random sequence and for supplying the modulated signal to said modulating circuit.

6. A digital broadcasting apparatus as set forth in claim 1, further comprising
   a frequency interleaving circuit for frequency interleaving said main signal using parameters, said parameters set based on said channel number.

7. A digital broadcasting apparatus as set forth in claim 2, wherein center frequencies of said plurality of channels are offset by a predetermined value.

8. A digital broadcasting method for generating a digital broadcasting signal based on data of source information and modulating the same to a predetermined broadcasting frequency for output, comprising:
   generating a sub-signal for controlling signal transmission;
   generating a pseudo-random sequence using an initial value of a random number code set based on said broadcasting frequency;
   modulating the sub-signal using the pseudo-random sequence;
   performing modulation according to a predetermined modulation scheme using a main signal generated based on the data of source information and the modulated sub-signal;
   dividing a bandwidth of said broadcasting frequency into a plurality of channels with each channel of said plurality of channels being assigned a predetermined channel number; and
   setting an initial value of a random number code for generating said pseudo-random sequence based on said channel number.

\* \* \* \* \*